Oct. 11, 1960
C. E. GATES
2,955,742
FLUID PRESSURE SYSTEM
Filed Feb. 6, 1959
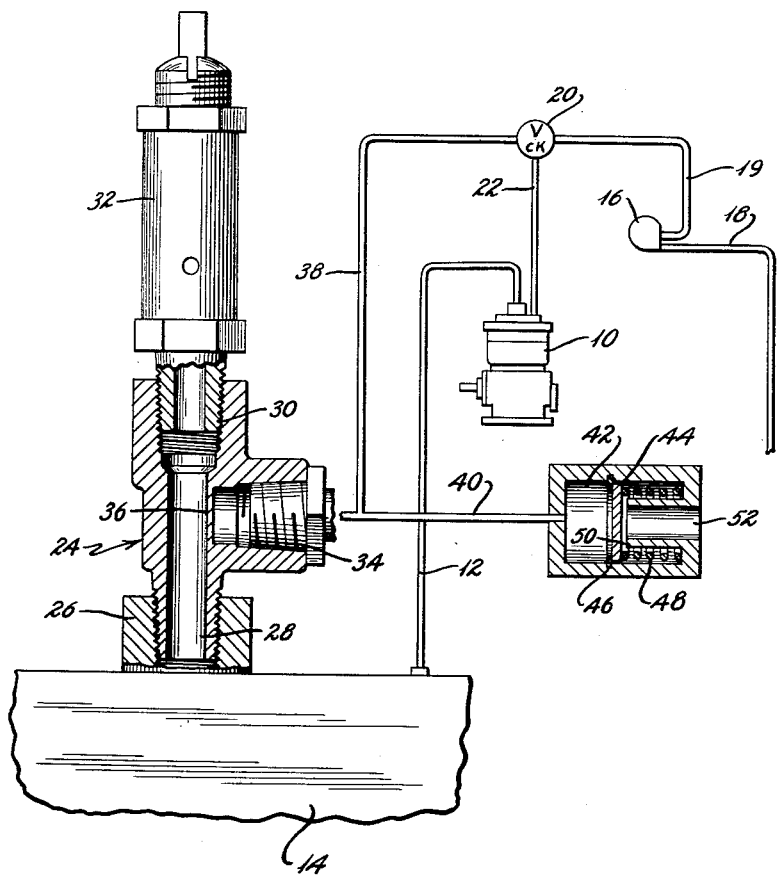
INVENTOR
*Charles E. Gates*
BY
*Scrivener & Parker*
ATTORNEYS

United States Patent Office 2,955,742
Patented Oct. 11, 1960

2,955,742

FLUID PRESSURE SYSTEM

Charles E. Gates, Elyria, Ohio, assignor to Bendix-Westinghouse Automotive Air Brake Company, Elyria, Ohio, a corporation of Delaware Filed Feb. 6, 1959, Ser. No. 791,552

6 Claims. (Cl. 230—7)

This invention relates to fluid pressure systems and more particularly to improved safety means for protecting a compressor-supplied fluid pressure system during unusual or emergency conditions.

The broad object of the present invention is to provide means for protecting a fluid pressure system from excessive high pressure when the usual means for limiting high pressure fails to operate.

More particularly, it is an object of the present invention to provide in combination with continuously operating governor-controlled compressor, automatic emergency means for unloading the compressor should the governor fail to operate to unload the compressor in the usual manner.

A still further object of the invention is to provide a safety means for the purposes set forth in the foregoing paragraph which in addition, is adapted to function when the usual safety valves fail to operate.

Other objects and their attendant advantages will become apparent when the following detailed description is read in conjunction with the accompanying single figure which illustrates schematically a fluid pressure system incorporating the features of the present invention.

With reference to the drawing, 10 designates a compressor which may be of the continuously operating type such as that carried on an automotive vehicle for providing fluid pressure for braking purposes. Such compressors are customarily equipped with unloaders which operate to retain the inlet check valve off its seat when a predetermined high pressure is reached in the system. In the system illustrated, the compressor 10 delivers pressure through a conduit 12 to a fluid pressure reservoir 14. The unloader is controlled by a governor 16 connected on one side by a conduit 18 to reservoir pressure and connected on the other by a conduit 19 to a double check valve 20 having a conduit 22 leading to the unloader. During normal operation of the system, when the reservoir pressure reaches a predetermined high value, the governor operates to connect lines 18 and 19 so that reservoir pressure is admitted by way of double check valve 20 and conduit 22 to the unloader to unload the compressor until the reservoir pressure falls to a predetermined low value at which time the governor operates to disconnect lines 18, 19 and connect the latter to atmosphere thereby loading the compressor.

Occasionally in systems of the type described, the governor fails to function and the compressor continues to operate to supply fluid pressure to the reservoir. When this occurs, reliance is usually placed on a safety valve to blow off extremely high pressures before reservoirs or conduits burst. Sometimes, however, because of long disuse or for other reasons, the safety valves fail to lift and serious accidents have resulted from the bursting of conduits and/or reservoirs. In accordance with the invention, this last hazard is eliminated by the provision of means for charging the unloader directly from the reservoir whenever the governor and the safety valve fail to function and reservoir pressure tends to build up to a dangerous high level. The means for accomplishing the foregoing comprises, in part, a threaded adapter 24 which replaces the usual safety valve normally received in a ferrule 26 atop the reservoir 14. The adapter comprises a body member having a central passage 28 open to the interior of the reservoir and having at its upper end an interiorly threaded port 30 corresponding in size to the interior of the ferrule 26 and received in the port 30 is a safety valve 32 of usual construction which need not be further described.

The adapter 24 is provided with a lateral port 34 which is separated from the interior of passage 28 by a frangible wall 36 designed to withstand normal high pressures up to the level of the unseating pressure of the safety valve 32 but designed to yield to a predetermined pressure exceeding the safety valve unseating pressure so as to connect the passage 28 and hence the interior of the reservoir to the port 34. Connected to the port 34 is a conduit 38 leading to the double check valve 20 which in turn is connected to the compressor unloader through the conduit 22 as above explained. Connected also to the conduit 38 is a branch conduit 40 leading to a velocity check valve chamber 42 containing therein a check valve 44 maintained in a normal open position against a stop ring 46 by a spring 48 surrounding a valve seat 50 at the inner end of an atmospheric port 52. The valve 44 is slightly less in diameter than the interior of chamber 42 so that small quantities of fluid flowing into chamber 42 may pass around the edges of the valve and out to atmosphere through the port 52. However, high pressure, such as would blow out the wall 36 of the adapter 24, flowing suddenly into chamber 42 will move the check valve 44 to seated position where it will remain until the force of the pressure thereon falls to a level slightly below the force of the spring 48.

During normal operation of the system shown in the drawing, the governor 16 responds to the pressure in reservoir 14 to load and unload the compressor. When the compressor is to be unloaded, fluid pressure is admitted to conduit 19 to displace the double check valve and close off the conduit 38 connected to the port 34. Any pressure which might tend to build up in line 38 by movement of the check valve to its seated position or by any pressure which might leak past the valve into passage 38 is exhausted to atmosphere through the velocity check valve chamber 42. Thus the possibility of a build-up of pressure in passage 38 is eliminated and there is no danger of such built-up pressure moving the check valve to a position closing off conduit 19 when the governor operates to connect conduit 19 to atmosphere for loading the compressor.

Should the governor fail to operate in the normal manner so that the compressor continues to deliver fluid pressure to the reservoir 14, the pressure eventually reaches a level where the safety valve normally unseats to relieve the excess pressure. However, should the latter fail to operate, the pressure continues to build up in the reservoir to a predetermined level above the unseating pressure of the safety valve but considerably below the bursting pressure of any part of the system. At this predetermined level, the wall 36 blows out and reservoir pressure is admitted to port 34 from whence the pressure flows to the velocity check valve chamber 42 causing the valve 44 to seal off exhaust port 52 and reservoir pressure also flows to the check valve 20 moving it to a position sealing off conduit 19 so that the pressure in conduit 38 flows through the conduit 22 to the unloader so as to unload the compressor thereby stopping further delivery of pressure to the reservoir 14. Desirably, a pressure responsive switch can be connected to the conduit 38 to energize a warning signal to inform the operator of a derangement in the system whenever the wall 36 blows out to admit reservoir pressure to conduit 38.

It will be apparent to those skilled in the art that the system shown and described is susceptible of a variety of modifications and changes without, however, departing from the scope and spirit of the appended claims.

What is claimed is:

1. In a fluid pressure system including fluidly interconnected compressor, reservoir, governor and unloader, means for operating said unloader upon failure of said governor comprising an adapter connected to said reservoir and having a passage therethrough connected at one end to the interior of said reservoir and at the other to a safety valve, a port in the side of said adapter connected to said unloader, check valve means between said port and said unloader, said valve means being responsive to the normal flow of fluid pressure between said governor and said unloader to close off the connection between said port and said unloader, and a frangible wall between said port and said passage, said frangible wall being responsive to a reservoir pressure greater than the unseating pressure of the safety valve so as to fail and admit reservoir pressure to said check valve to move it to a position closing off said connection between said governor and said unloader and admit reservoir pressure to said unloader to unload the compressor.

2. The system of claim 1 including a velocity check valve connected to said port and normally affording a connection between said port and atmosphere but responsive to a surge of pressure upon failure of said frangible wall to close off said connection to atmosphere.

3. In combination with a compressor, a fluid pressure reservoir fluidly connected to the compressor, an unloader for said compressor and a fluid pressure governor fluidly connected between said reservoir and said unloader, means for controlling the unloader independently of said governor comprising a body member attached to said reservoir and having a passage therein communicating with the interior of said reservoir, a port in said body member, a frangible wall separating said port and said passage, said port being connected to said unloader, said unloader being operated upon failure of said frangible wall by a predetermined high pressure in said reservoir.

4. The combination of claim 3 including means for attaching a safety valve to said body member in communication with said passage.

5. The combination of claim 3 wherein said port and said governor have a common connection with said unloader, and a double check valve between said port and governor to close off the respective connections between said governor and said unloader or said port and said unloader depending on whether said unloader is under control of said governor or under control of reservoir pressure from said port.

6. The combination of claim 5 including a velocity check valve connected to said port and said check valve, said velocity check valve connecting said port to atmosphere when low pressures prevail between said port and said check valve but disconnecting said port from atmosphere when high pressure prevails between said port and said check valve.

No references cited.